United States Patent
Jia et al.

(10) Patent No.: US 12,363,636 B2
(45) Date of Patent: Jul. 15, 2025

(54) ALIGNING TARGET BEACON TRANSMISSION TIME FOR MULTI-LINK CONNECTION

(71) Applicant: Hewlett Packard Enterprise Development LP, Spring, TX (US)

(72) Inventors: Xuguang Jia, Beijing (CN); Qiang Zhou, San Jose, CA (US); Guangzhi Ran, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 394 days.

(21) Appl. No.: 17/932,210

(22) Filed: Sep. 14, 2022

(65) Prior Publication Data

US 2024/0089854 A1     Mar. 14, 2024

(51) Int. Cl.
*H04W 52/02*     (2009.01)
*H04W 56/00*     (2009.01)

(52) U.S. Cl.
CPC ... *H04W 52/0216* (2013.01); *H04W 52/0274* (2013.01)

(58) Field of Classification Search
CPC ............... H04W 52/0216; H04W 52/0274
USPC ........................................................ 370/318
See application file for complete search history.

(56) References Cited

U.S. PATENT DOCUMENTS

| | | | |
|---|---|---|---|
| 11,191,026 B1 | 11/2021 | Jia et al. | |
| 2010/0232400 A1* | 9/2010 | Patil | H04W 88/10 370/337 |
| 2011/0141966 A1* | 6/2011 | Kasslin | H04L 67/59 370/328 |
| 2013/0094413 A1* | 4/2013 | Turunen | H04W 76/28 370/311 |
| 2018/0234918 A1 | 8/2018 | Asterjadhi et al. | |
| 2020/0288523 A1* | 9/2020 | Patil | H04W 80/02 |
| 2021/0007168 A1* | 1/2021 | Asterjadhi | H04W 52/0235 |
| 2021/0051513 A1* | 2/2021 | Min | H04W 72/21 |
| 2021/0282119 A1* | 9/2021 | Asterjadhi | H04W 76/15 |
| 2022/0174536 A1* | 6/2022 | Kwon | H04W 28/0268 |
| 2022/0408355 A1* | 12/2022 | Shafin | H04W 52/0216 |
| 2022/0408506 A1* | 12/2022 | Kim | H04W 28/20 |

(Continued)

OTHER PUBLICATIONS

Ming Gan, Huawei, "Power Save for Multi-link", Nov. 2019, 15 Pages.

(Continued)

*Primary Examiner* — Mark G. Pannell
(74) *Attorney, Agent, or Firm* — Hewlett Packard Enterprise

(57) ABSTRACT

In embodiments of the present disclosure, there is provided an approach for aligning target beacon transmission time (TBTT) for multi-link connection. A method comprises setting up a first link and a second link between an access point (AP) and a wireless device based on multi-link operation (MLO), and obtaining a first TBTT of the first link and a second TBTT of the second link. The method further comprises aligning the first TBTT and the second TBTT at a start time, and then transmitting beacon frames on the first link and the second link according to the aligning of the first TBTT and second TBTT. Embodiments of the present disclosure synchronize and align the beacon TBTTs for different links, and can reduce the wake-up time on all active links, thereby saving power for the wireless device.

18 Claims, 9 Drawing Sheets

(56) References Cited

U.S. PATENT DOCUMENTS

| | | | | |
|---|---|---|---|---|
| 2023/0054755 | A1* | 2/2023 | Patil | H04W 76/15 |
| 2023/0144291 | A1* | 5/2023 | Naik | H04W 74/0816 |
| | | | | 370/329 |
| 2023/0292225 | A1* | 9/2023 | Ratnam | H04W 74/06 |
| 2023/0371078 | A1* | 11/2023 | Takada | H04W 74/0816 |
| 2024/0237072 | A1* | 7/2024 | Choi | H04W 84/12 |

OTHER PUBLICATIONS

Porsch et al., "Aligned Beacon Transmissions to Increase IEEE 802.11s Light Sleep Mode Scalability", Sep. 2014, 13 Pages.

* cited by examiner

ALIGNING TARGET BEACON TRANSMISSION TIME FOR MULTI-LINK CONNECTION

BACKGROUND

An access point (AP) is a networking device that creates a wireless local area network (WLAN) and allows one or more stations to connect to a wide area network (WAN). The AP may establish a link with a station on a channel. Usually, the AP connects to a router or a switch via a wired or wireless network, as a standalone device. The AP may be also implemented as an integral component of a wireless router or a wireless switch.

MLO (Multi-link operation) is a new feature introduced in IEEE 802.11be (Wi-Fi 7), and the MLO enables a non-AP MLD (Multi-link device) to discovery, authenticate, associate, and setup multiple links with an AP MLD. After the MLO setup procedure, each link enables channel access and frame exchanges between the non-AP MLD and the AP MLD, and each link may transmit and receive data independently.

BRIEF DESCRIPTION OF THE DRAWINGS

Embodiments of the present disclosure may be understood from the following Detailed Description when read with the accompanying Figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

As discussed above, IEEE 802.11be (Wi-Fi 7) introduces a new feature of MLO that enables the utilization of multiple links to transmit and receive data, and each link may transmit and receive data independently. MLO may aggregate multiple channels on different frequency bands at the same time, and can enable network traffic flow seamlessly even if there is interference or congestion.

Traditionally, no power save coordination among the multiple links of the MLO is considered. Generally, when a wireless device (such as a mobile device) wants to run in real power save (PS) mode, it needs to enter PS mode in all active links. However, the wireless device may wake up in one link while it is in PS mode for another link, which makes the overall power save scheme for the wireless device inefficient. Thus, there is a problem that the power of the wireless device cannot be effectively saved during the MLO.

Embodiments of the present disclosure propose an optimized power save scheme for Wi-Fi multi-link connection by coordinating all the links during the multi-link connection, and can improve PS mode efficiency for wireless devices by solving the problem how to effectively save power during the MLO. The present disclosure synchronizes and aligns the beacon TBTTs of different links, so as to reduce the wake-up time on all active links, thereby saving more power for the wireless device.

According to embodiments of the present disclosure, TBTTs of different links (such as two links, three links and so forth) are aligned at a start time, and the beacon frames of different links all begin at the same start time. As such, the beacon frames on different links are transmitted at the same time, rather than different time, and different links can have more common inactive time. In this way, the wireless device can have more sleep time on the links, and can save more power than the traditional way.

Other advantages of embodiments of the present disclosure will be described with reference to the example implementation as described below. Reference is made below to FIG. 1 through FIG. 8 to illustrate basic principles and several example embodiments of the present disclosure herein.

Figure 1:
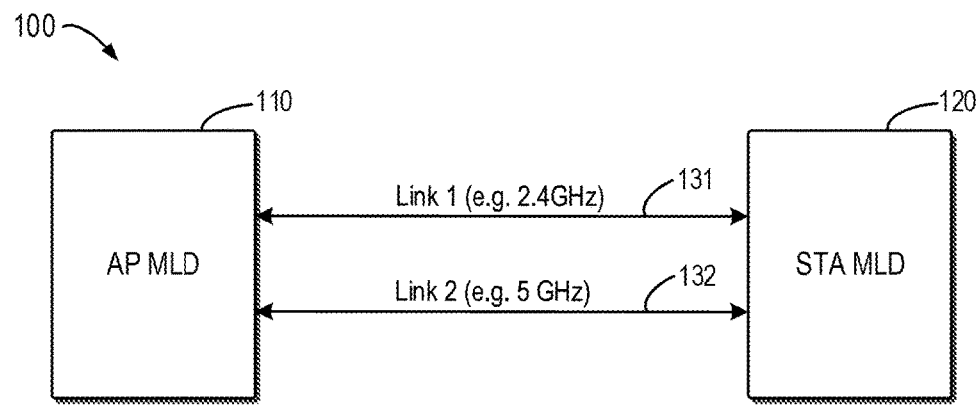
FIG. 1 illustrates an example environment of a multi-link operation (MLO) between two MLDs.

FIG. 1 illustrates an example environment 100 of the MLO between two MLDs. As shown in FIG. 1, the environment 100 comprises an AP MLD 110 (also referred to as an AP) and a non-AP MLD such as a station (STA) MLD 120 (also referred to as a STA). The AP MLD 110 is a networking hardware device that allows other Wi-Fi devices to connect to the WAN, and provides wireless connections using WLAN for other Wi-Fi devices to use the WAN. The STA MLD 120 is a device that has the capability to use the IEEE 802.11 protocol, and the STA MLD 120 may be a laptop, a desktop computer, a cellphone or other Wi-Fi enabled wireless devices.

As used herein, a MLD is a device that is a logical entity and has more than one affiliated station, and has a single medium access control (MAC) service access point (SAP) to logical link control (LLC), which includes one MAC data service. An AP MLD is AP where each station affiliated with the MLD is an AP, a non-AP MLD is a station that supports reception and transmission frames on more than one link at a time. A STA, which is affiliated with an MLD, may select and manage its capabilities and operating parameters independently from other STA(s) affiliated with the same MLD.

As shown in FIG. 1, multiple links (link 131 and link 132) are established simultaneously between the AP MLD 110 and the STA MLD 120 by use of the MLO, and the MLO enables link aggregation at the MAC layer and aggregates multiple channels on different frequencies at the same time. Each link may be mapped to a channel and band, for example, the first link 131 may work at 2.4 GHz, while the second link 132 may work at 5 GHz. For example, the STA MLD 120 may start scanning at 2.4 GHz, and select 5 GHz based on out-of-band discovery such as reduced neighbor report (RNR).

Due to the multiple links in parallel between two MLDs, higher throughput, lower latency and higher reliability CAN be achieved, which are useful for a number of scenarios, such as virtual reality (VR), augmented reality (AR), industrial internet of things (IoT) and so on.

It is to be understood that although two links are shown in FIG. 1 based on the MLO, the MLO may have more links between the AP MLD 110 and the STA MLD 120. It is also to be understood that although the first link 131 is shown at 2.4 GHz, while the second link 132 is shown at 5 GHz, the first link 131 and/or second link 132 may work at other frequencies, such as 6 GHz.

Figure 2:
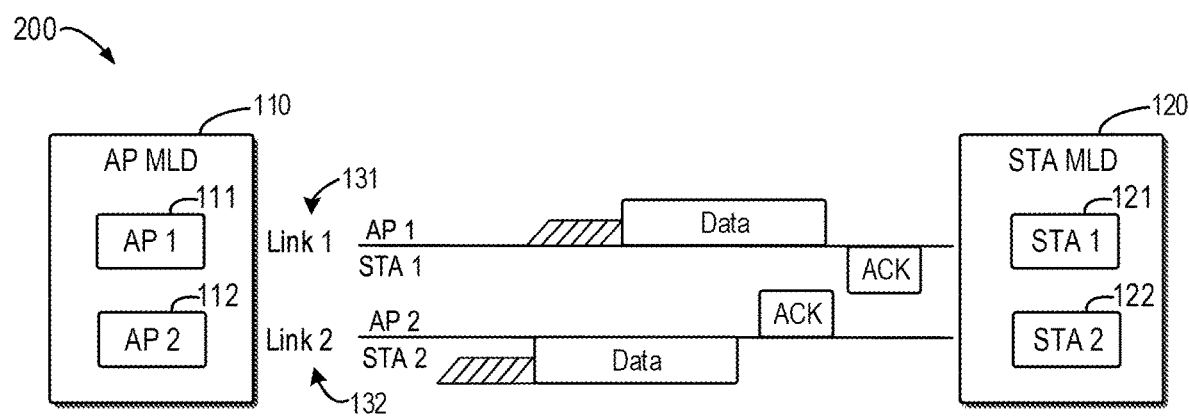
FIG. 2 illustrates an example environment of channel access of two MLDs over a simultaneous transmit and receive (STR) link pair.

FIG. 2 illustrates an example environment 200 of channel access of two MLDs over a simultaneous transmit and receive (STR) link pair. As shown in FIG. 2, the AP MLD 110 establishes two links with the STA MLD 120 based on the MLO, where AP1 111 affiliated with the AP MLD 110 has downlink traffic to the STA1 121 affiliated the STA MLD 120, while AP2 112 affiliated with AP MLD 110 has uplink traffic from STA2 122 affiliated with the STA MLD 120.

FIG. 2 shows that the AP MLD 110 and the STA MLD 120 are operating over an STR link pair and contending for frame exchanges between two MLDs on those links. After the AP MLD 110 has performed a multi-link setup with the STA MLD 120 to setup the first link 131 and the second link 132 successfully, the AP1 111 may transmit data frames to the STA1 121 on link 131, and the AP2 112 may receive data frames from the STA2 122 on link 132.

For example, the STA1 121 may find an AP1 111 so as to establish MLD setup with the AP MLD 110. That is, STA1 121 may discover at least one AP in the AP MLD 110 to initiate authentication and MLD setup. The MLD link setup creates links 131 and 132, and the MLD link setup signaling is transmitted over a single link. In some cases, an AP in the AP MLD 110 may be unavailable, and the STA MLD 120 may detect the availability of each AP and/or each link.

As shown in FIGS. 1-2, each MLD owns different links (such as links 131 and 132) that are located on different channels and/or different bands. The same traffic identifier (TID) traffic is allowed to have frame exchanges on the different links with default TID-mapping, and it is also optional to support for TID-to-link mapping negotiation. The TID-to-link mapping mechanism allows an AP MLD and a non-AP MLD that performed multi-link setup to determine how TIDs are mapped to the setup link in downlink (DL) and in uplink (UL). By default, all TIDs are mapped to all setup links for both DL and UL. When both MLDs have explicitly negotiated a TID-to-link mapping by following the procedure, each TID may be mapped to the same or different links.

Figure 3:
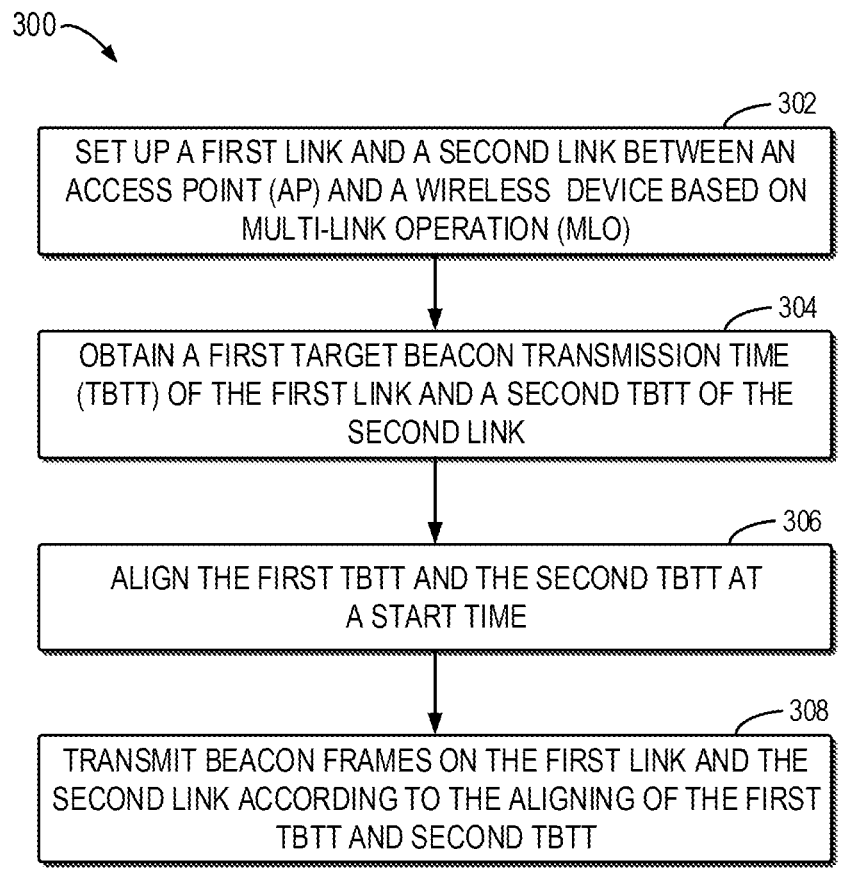
FIG. 3 illustrates a flow chart of an example method for aligning target beacon transmission time (TBTT) for multi-link connection according to embodiments of the present disclosure.

FIG. 3 illustrates a flow chart of an example method 300 for aligning TBTTs for multi-link connection according to embodiments of the present disclosure. To better describe the method 300, reference is made to FIGS. 4A-4B which illustrate an example for aligning TBTTs of two links of MLO according to embodiments of the present disclosure.

Figure 4A:
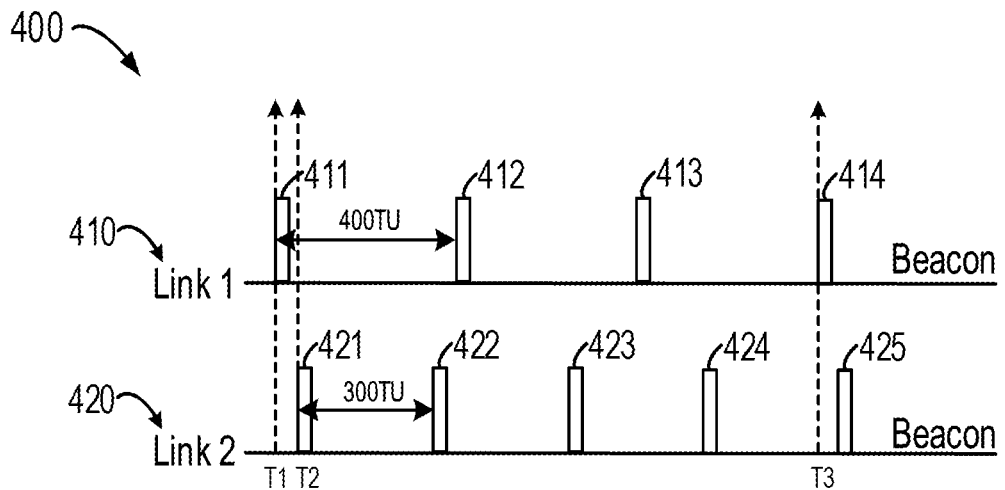
FIGS. 4A-4B illustrate an example for aligning TBTTs of two links of the MLO according to embodiments of the present disclosure.

At 302, a first link and a second link are set up between an access point (AP) and a wireless device based on multi-link operation (MLO). For example, as indicated by 400 in FIG. 4A, the first link 410 (also referred to as link 1) and the second link 420 (also referred to as link 2) of the MLO are established between two MLDs, such as the AP MLD 110 and the STA MLD 120. As shown in FIG. 4, beacon frames 411, 412, 413 and 414 are transmitted on the link 410, and a beacon interval on the link 410 is 400 time unit (TU). The beacon frames 421, 422, 423, 424 and 425 are transmitted on the link 420, and a beacon interval on link 420 is 300 TU. For example, a TU is equal to 1024 microseconds.

As used herein, a beacon frame is one of the management frames in IEEE 802.1 based WLANs, and it contains the information about the network. The beacon frames are transmitted periodically, and they serve to announce the presence of a WLAN and to synchronize the members of the service set.

At 304, a first target beacon transmission time (TBTT) of the first link and a second TBTT of the second link are obtained. For example, as shown in FIG. 4A, the beacon frame 411 on the link 410 is transmitted at start time T1 which may be regarded as the first TBTT, while the beacon frame 421 on the link 420 is transmitted at start time T2 which may be regarded as the second TBTT. Each time the beacon is transmitted, the wireless device will wake up from PS mode, and each wake up of radio will invoke host CPU to wake up and consumes power of the wireless device.

The PS mode may be a built-in mode that allows devices to save power by analyzing the data usage pattern with time and then making sure that the Wi-Fi does not drain too much battery of the devices. For example, a radio may be in one of the two power states, an awake state indicates that the radio is constantly powered and able to receive and transmit data, while a doze state indicates that the radio is not able to receive and transmit data and consumes lower power. The radio power state may be transitioned between the awake state and the doze state according to the IEEE 802.11 power management rules. To save more power, it is desired to reduce wake-up time of radio and/or processor (such as CPU) on all active links. As shown in FIG. 4A, the start time T1 and the start time T2 are not aligned, and thus more wake-up times are caused during the period T1-T3.

Figure 4B:
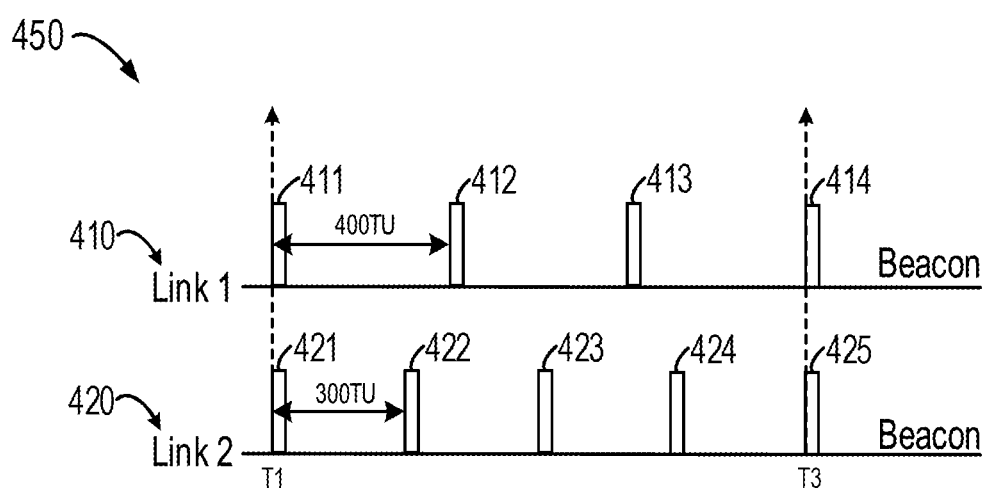

At 306, the first TBTT and the second TBTT are aligned at a start time. For example, as indicated by 450 in FIG. 4B, the start time (the second TBTT) of the beacon frame 421 on the link 420 is aligned with the start time (the first TBTT) of the beacon frame 411 on the link 410 at the start time T1. The wake-up times of the wireless device during the period T1-T3 in FIG. 4B is 6, while the wake-up times of the wireless device during the period T1-T3 in FIG. 4A is 7. Thus, the wake-up times of the wireless device during the period T1-T3 in FIG. 4B is less than that in FIG. 4A, which can reduce wake-up time of the wireless device.

At 308, beacon frames on the first link and the second link are transmitted according to the aligning of the first TBTT and second TBTT. For example, as shown in FIG. 4B, after the alignment of the TBTTs of links 410 and 420 at the start time T1, the bacon frames 411, 412, 413 and 414 are transmitted on the link 410, and the beacon frames 421, 422, 423, 424 and 425 are transmitted on the link 420.

According to the method 300 of the present disclosure, an optimized power save scheme for Wi-Fi multi-link connection can be achieved by coordinating all the links during the multi-link connection. The present disclosure synchronizes and aligns the beacon TBTTs of different links, so as to reduce the wake-up time on all active links, thereby saving more power for the wireless device.

In some embodiments, a target time may be selected for aligning the TBTTs on different links, and the target time will be regarded as the start time for transmitting an earliest beacon frame on each link. For example, as shown in FIG. 4B, the time T1 is selected as the target time for aligning the TBTTs on different links. Alternatively, the time T2 may be also selected as the target time for aligning the TBTTs on different links.

In some embodiments, the beacon intervals for transmitting beacon frames on different links may be adjusted to be the same. For example, a beacon interval of one link may be adjusted to be same as a beacon interval of another link if the two beacon intervals are different. In the example of FIG.

4B, the beacon interval on link 420 may be adjusted from 300 TU to 400 TU. In this way, the wake-up time of the wireless device can be further reduced.

Figure 5A:
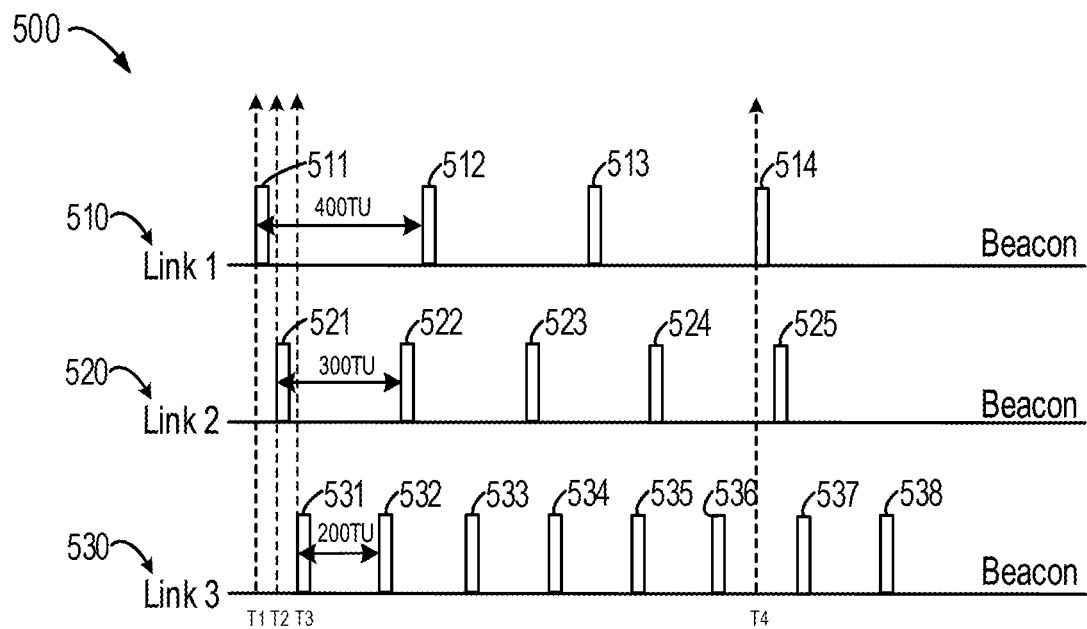
FIGS. 5A-5C illustrate another example for aligning TBTTs of three links of the MLO according to embodiments of the present disclosure.
Figure 5B:
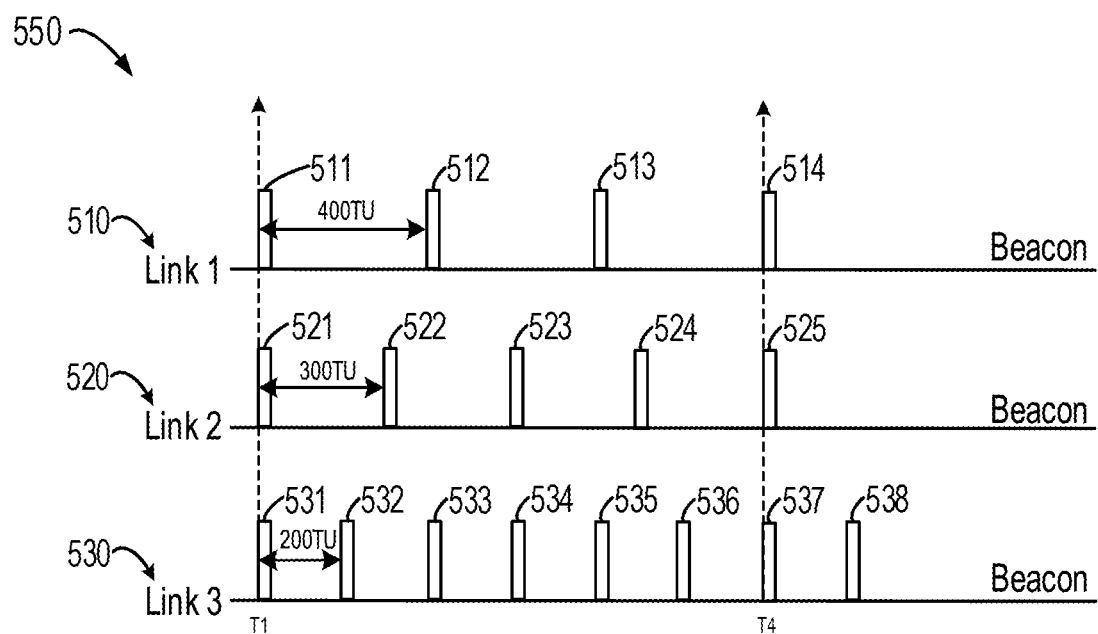
Figure 5C:
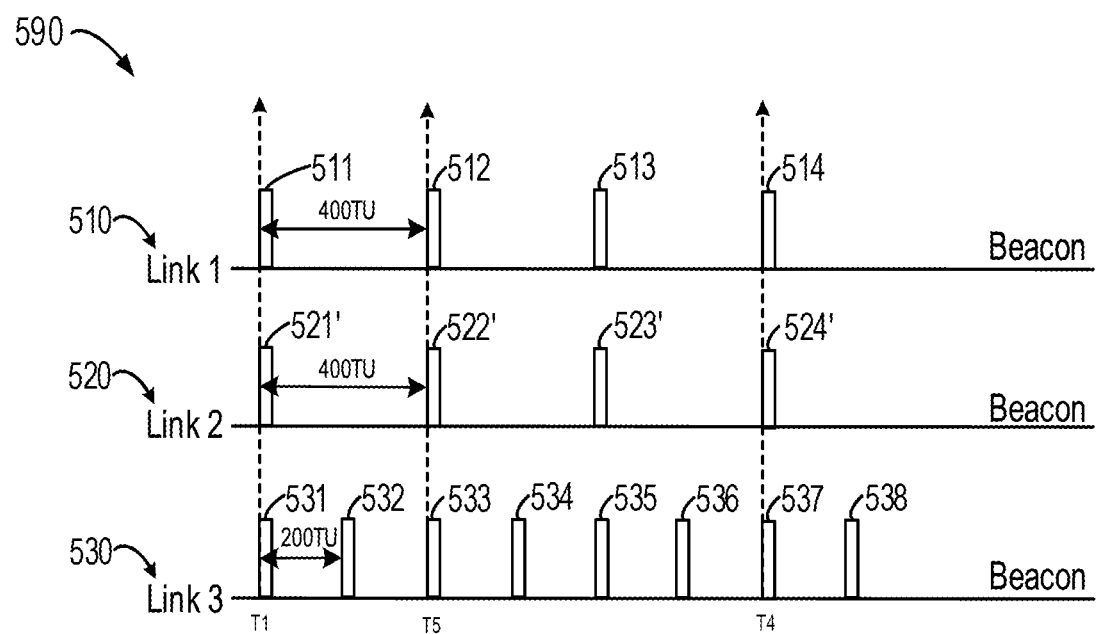

FIGS. 5A-5C illustrate another example for aligning TBTTs of three links of MLO according to embodiments of the present disclosure, and in this example, no offset exists by use of the beacon synchronization. In the example of FIGS. 5A-5C, there are three links between an AP MLD (such as AP MLD 110) and a non-AP MLD (such as STA MLD 120), which includes a first link 510, a second link 520 and a third link 530. Each link may have the transmitted virtual AP (TX VAP) and send out beacon frames from the AP MLD 110 to the STA MLD 120.

In embodiments of the present disclosure, to save power on the wireless device (such as the STA MLD 120), the wake-up times or the wake-up ratio of the STA MLD 120 needs to be reduced, because the lower wake-up times or the wake-up ratio can achieve better power-saving for the wireless device. In some embodiments, the wake-up ratio $WR_{beacon}$ may be defined to be a ratio of wake-up times in single beacon period and least common multiple (LCM) of the beacon intervals of all links in time unit (such as 100 TU). For example, the wake-up ratio $WR_{beacon}$ may be defined by the following equation (1).

$$WR_{beacon} = \frac{\text{Wakeup\_times}_{link1\_n}}{T_{total}/100} \quad (1)$$

where $T_{total}$ represents the LCM of the beacon intervals of links 1–n, $\text{Wakeup\_times}_{link1\_n}$ represents the total wake-up times of links 1–n during the LCM, and n represents the number of all links between two MLDs.

After a start time $T_{start}$ of a target period is selected where the time length of the target period is LCM, the end time $T_{end}$ of the target period may be determined by the following equation (2).

$$T_{end} = T_{start} + T_{total} \quad (2)$$

During the target period [$T_{start}$, $T_{end}$], the wake-up points of each link may be counted, and $\text{Wakeup\_times}_{link1}$, $\text{Wakeup\_times}_{link2}$, ..., $\text{Wakeup\_times}_{linkn}$ may be determined. Then, all the wake-up points of all links are sorted and then the repeated wake-up points are removed, and the wake-up times $\text{Wakeup\_times}_{link1\_n}$ may be determined, which represents the total wake-up times of links 1–n during the target period [$T_{start}$, $T_{end}$]. As such, the value of the wake-up ratio may be calculated for saving power on the wireless devices.

As indicated by 500 in FIG. 5A, it is a case where a TBTT offset exists. As compared with FIG. 4A, there are three links between the AP MLD 110 and the STA MLD 120 in FIG. 5A, a first link 510, a second link 520 and a third link 530. As shown in FIG. 5A, beacon frames 511, 512, 513 and 514 are transmitted on link 510, and a beacon interval on the link 510 is for example 400 TU. Beacon frames 521, 522, 523, 524 and 525 are transmitted on link 520, and a beacon interval on link 520 is for example 300 TU. Beacon frames 531, 532, 533, 534, 535, 536, 537 and 538 are transmitted on link 530, and a beacon interval on link 530 is for example 200 TU.

Continue to refer to FIG. 5A, the beacon frame 511 on the link 510 is transmitted at start time T1 which may be regarded as the first TBTT, the beacon frame 521 on the link 520 is transmitted at start time T2 which may be regarded as the second TBTT, and the beacon frame 531 on the link 530 is transmitted at start time T3 which may be regarded as the third TBTT. Each time the beacon is transmitted on any of the three links, the wireless device will wake up from PS mode and consume more power.

In FIG. 5A, the TBTT offset between the link 510 and the link 520 is 50 TU at a start time T1, and the TBTT offset between the link 520 and the link 530 is 50 TU at a start time T2. Since the beacon intervals of the three links are 400 TU, 300 TU and 200 TU, the $T_{total}$ representing LCM of beacon intervals of the three links is determined as 1200 TU. The time T1 is picked as start time $T_{start}$, the time T4 is picked as the end time $T_{end}$, and T4−T1=1200 TU.

As shown in FIG. 5A, during the time T1 and T4, the link 510 wakes up at time (0, 400, 800)TU, the link 520 wakes up at time (50, 350, 650, 950)TU, and the link 530 wakes up at time (100, 300, 500, 700, 900, 1100)TU. In this case, with the TBTT offset among the three links, the total wake-up times $\text{Wakeup\_times}_{link1\_n}$ of all links between the start time T1 and the end time T4 is 13 in each 1200 TU. Thus, according to the above equation (1), in the case where a TBTT offset exists, the wake-up ratio $WR_{beacon}$ is calculated to be 1.083.

As indicated by 550 in FIG. 5B, which illustrates a case where no TBTT offset exists due to the beacon synchronization. As compared with FIG. 5A, the start time T1 of the link 510, the start time T2 of the link 520 and the start time T3 of the link 530 are aligned to be the same start time T1 in FIG. 5B. In some embodiments, the links 510, 520 and 530 may be synchronized based on the timing synchronization function (TSF) in beacon marked by radio hardware. For example, tri-band devices are mounted over all three links, the link 510 and the link 520 may be synchronized first, and then the link 520 and the link 530 may be synchronized. In some embodiments, it is possible that not all of the TBTTs of the three links are aligned and synchronized. For example, the start time of the link 520 is moved to the start time T1, while the start time of the link 530 remains unchanged at time T3. For another example, the start time of the link 530 is moved to the start time T1, while the start time of the link 520 remains unchanged at time T2.

In FIG. 5B, at the start time T1, there is no TBTT offset among link 510, link 520 and link 530. Since the beacon intervals of the three links are 400 TU, 300 TU and 200 TU, the $T_{total}$ representing LCM of the beacon intervals of the three links is still determined as 1200 TU. The time T1 is picked as the start time $T_{start}$, time T4 is picked as the end time $T_{end}$, and T4−T1=1200 TU.

As shown in FIG. 5B, during the time T1 and T4, the link 510 wakes up at time (0, 400, 800)TU, the link 520 wakes up at time (0, 300, 600, 900)TU, the link 530 wakes up at time (0, 200, 400, 600, 800, 1000)TU. In this case, since there is no TBTT offset among the three links, the total wake-up times $\text{Wakeup\_times}_{link1\_n}$ of all links between the start time T1 and the end time T4 is 8 in each 1200 TU. Thus, according to the above equation (1), in the case where no TBTT offset exists, the wake-up ratio $WR_{beacon}$ is calculated to be 0.667. As compared with FIG. 5A, the wake-up ratio in FIG. 5B is reduced, thereby saving more power for the wireless device.

In some embodiments, some or all of the beacon intervals for transmitting beacon frames on different links may be adjusted to be the same. For example, as indicated by 590 in FIG. 5C, which illustrates a case where no TBTT offset exists and some of the beacon intervals are adjusted to be the same. In FIG. 5C, the beacon interval of the link 520 is increased from 300 TU to 400 TU which is the maximum beacon interval of the three links. Beacon frames 521', 522', 523' and 524' are transmitted on link 520, and a beacon interval on link 520 is 400 TU. In this way, the wake-up times of the wireless device can be further reduced.

In FIG. 5C, at the start time T1, there is no TBTT offset among link 510, link 520 and link 530. Since the beacon intervals of the three links are 400 TU, 400 TU and 200 TU, the $T_{total}$ representing LCM of the beacon intervals of the three links is determined as 400 TU. The time T1 is picked as start time $T_{start}$, and the time T5 is picked as the end time $T_{end}$, and T5−T1=400 TU.

As shown in FIG. 5C, during the time T1 and T5, the link 510 wakes up at time (0)TU, the link 520 wakes up at time (0)TU, and the link 530 wakes up at time (0, 200)TU. In this case, since there is no TBTT offset among the three links, the total wake-up times Wakeup_times$_{link1\_n}$ of all links between the start time T1 and the end time T5 is 2 in each 400 TU. Thus, according to the above equation (1), in the case where no TBTT offset exists and the beacon interval of the link 520 is adjusted to be the same as beacon interval of the link 510, the wake-up ratio WR$_{beacon}$ is calculated to be 0.5. As compared with FIG. 5B, the wake-up ratio in FIG. 5C can be further reduced, thereby further saving more power for the wireless device.

In some embodiments, all the beacon intervals of all links may be adjusted to be the same. In this case, the total wake-up time Wakeup_times$_{link1\_n}$ of all links in each 400 TU is 1, and the wake-up ratio WR$_{beacon}$ is calculated to be 0.25. In this way, by adjusting some or all of the beacon intervals of links to be the same, the more sleep time of the radio of the wireless device is obtained, and the power of the wireless device can be further saved.

Target wake time (TWT) is a function that permits an AP to define a specific time or a set of times for individual stations to access the medium. The STA and the AP exchanges information that includes an expected activity duration in order to allow the AP to control the amount of contention and overlap among competing STAs. The use of TWT is negotiated between the AP and the STA, and TWT may be used to reduce energy consumption, as the STA that uses it can enter a sleep state until its TWT arrives.

Figure 6A:
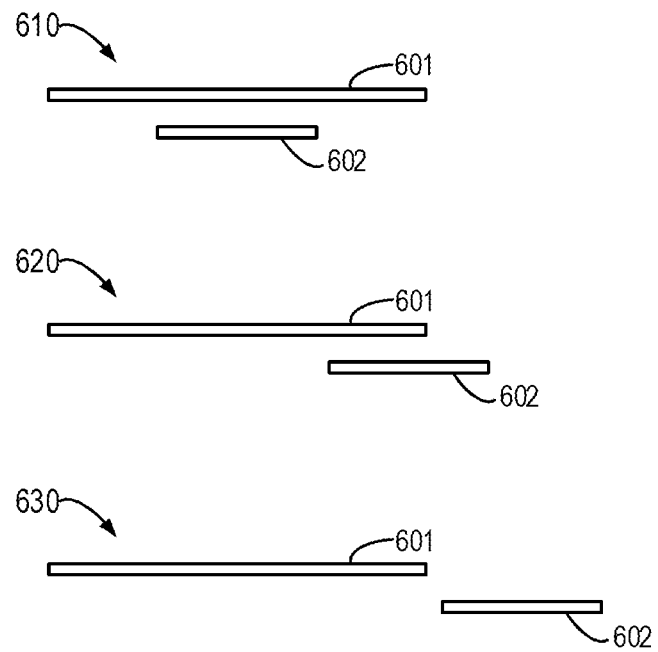
FIGS. 6A-6B illustrate example relationships between two target wake time (TWT) service periods (SPs)
Figure 6B:
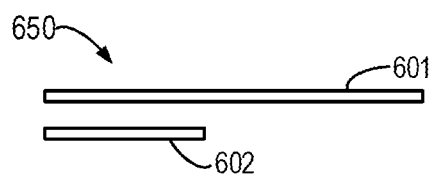

Embodiments of the present disclose may be used to align TWTs. FIGS. 6A-6B illustrate example relationships between two sequential TWT SPs. As shown in FIG. 6A, for the individual TWT SP 601 on link 1 and the individual TWT SP 602 on link 2, there are three different relationships between them. As indicated by 610, current TWT SP 601 has an inclusion relation with the next TWT SP 602. As indicated by 620, current TWT SP 601 has an intersected relation with the next TWT SP 602. As indicated by 630, current TWT SP 601 has a disjointed relation with the next TWT SP 602. According to embodiments of the present discourse, the overlapped TWT sessions on different link may be negotiated, and the start time of TWT SPs may be aligned and synchronized as indicated by 650 in FIG. 6B.

In some embodiments, TWT s on different links may be aligned, and the TWT sessions on different links may be transmitted according to the alignment of the TWTs. For individual TWT, broadcast TWT, or restricted TWT, it may include TWT wake time, TWT wake interval and TWT duration. The TWT duration is maximum serve time for each TWT SP in TWT sessions. In a case where there is individual TWT, broadcast TWT, or restricted TWT on all links, each link may have a TWT parameter for the three TWT modes.

Figure 7A:
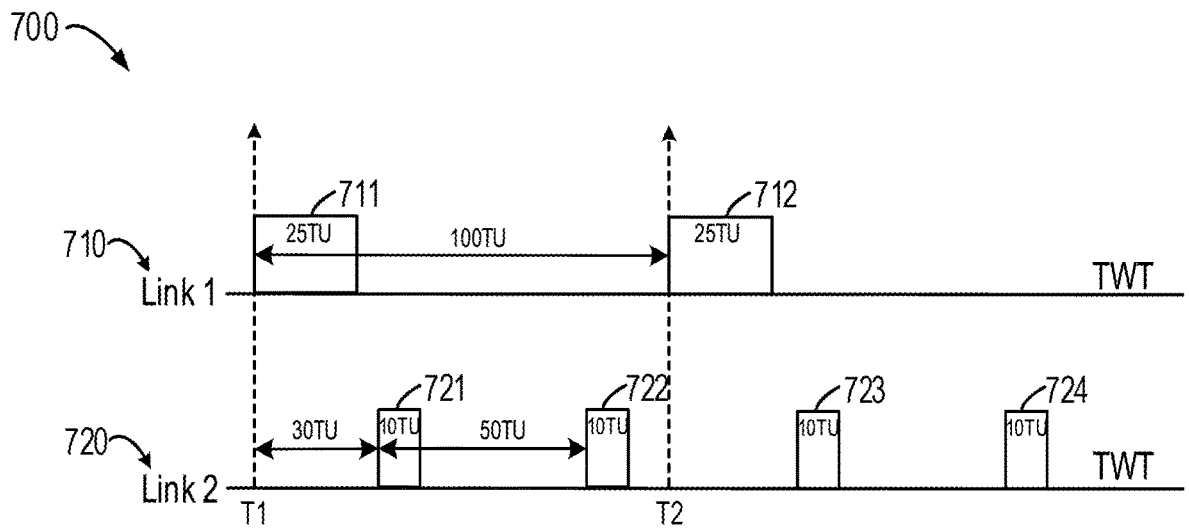
FIGS. 7A-7C illustrate an example for aligning TWT start time of three links of the MLO according to embodiments of the present disclosure.
Figure 7B:
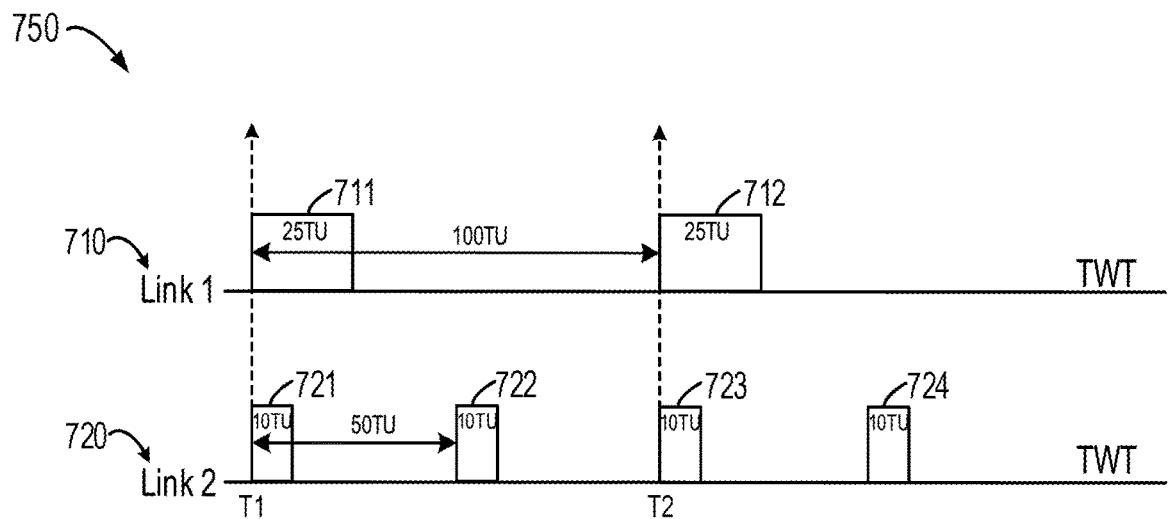
Figure 7C:
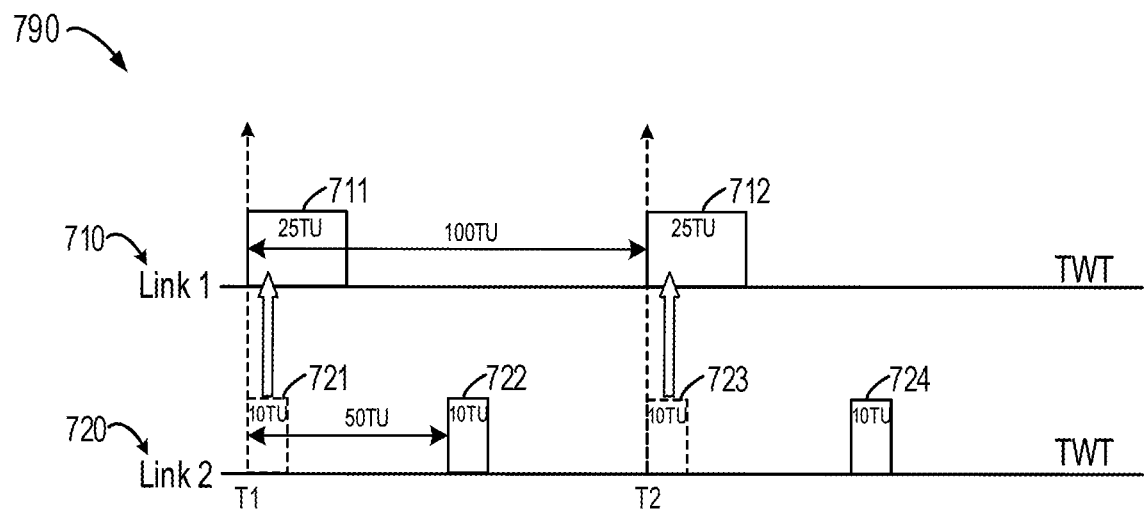

FIGS. 7A-7C illustrate an example for aligning TWT start time of two links of MLO according to embodiments of the present disclosure. In the example of FIGS. 7A-7C, there are two links between an AP MLD (such as AP MLD 110) and a non-AP MLD (such as STA MLD 120), which includes a first link 710 and a second link 720. The TWT parameter of link X TWT$_{parameter(X)}$ may be defined by the following equations (3)-(6).

$$TWT_{parameter(X)} = \{TWT_{start(X)}, TWT_{interval(X)}, TWT_{duration(X)}\} \quad (3)$$

where TWT$_{start(X)}$ represents a start time of TWT wake time on link X, TWT$_{interval(X)}$ represents TWT wake interval on link X, and TWT$_{duration(X)}$ represents TWT wake duration on link X.

$$TWT_{SP_{start}(X,n)} = TWT_{start(X)} + (n-1)TWT_{interval(X)} \quad (4)$$

where TWT$_{SP_{start}(X,n)}$ represents TWT SP start time of link X at the cycle n.

$$TWT_{SP_{end}(X,n)} = TWT_{SP_{start}(X,n)} + TWT_{duration(X)} \quad (5)$$

where TWT$_{SP_{end}(X,n)}$ represents TWT SP end time of link X at the cycle n.

$$TWT_{SPs(X)} = \{TWT_{SP(X,n)} | X, n > 0 \text{ and } X, n \in N\} \quad (6)$$

where TWT$_{SPs(X)}$ represents TWT SP wake-up time of link X, and TWT$_{SP(X,n)}$ represents the TWT SP wake-up time on link X at the cycle n.

To reduce the wake-up time of the wireless devices (such as STA MLD 120), embodiments of the present disclosure negotiates the overlapped TWT SPs such that the time space of TWT interval LCM of links X and Y is not an empty set, that is, TWT$_{SPs(X)}$ ∩ TWT$_{SPs(Y)}$ ≠ ∅.

In some embodiments, the wake-up ratio WR$_{TWT}$ may be defined to be a ratio of TWT wake-up time length on all links and LCM of the TWT intervals of all links in time unit (such as 100 TU). For example, the wake-up ratio WR$_{TWT}$ may be defined by the following equation (7).

$$WR_{TWT} = \frac{\text{Wake up time length in } TWT \text{ } SPs}{LCM_{TWT\_interval} \text{ in Time unit}} \quad (7)$$

where LCM$_{TWT\_interval}$ represents the LCM of the TWT intervals of all links.

As indicated by 700 in FIG. 7A, which illustrates a case where a TWT offset exists. As shown in FIG. 7A, there are two links, a first link 710 and a second link 720, between the AP MLD 110 and the STA MLD 120. TWT SPs 711 and 712 are on link 710, a TWT wake interval on link 710 is 100 TU, and TWT wake duration on link 710 is 25 TU. TWT SPs 721, 722, 723 and 724 are on link 720, a TWT wake interval on link 720 is 50 TU, and TWT wake duration on link 720 is 10 TU.

Continue to refer to FIG. 7A, TWT SP 711 on link 710 begins at start time T1 which may be regarded as the first TWT, and TWT SP 721 on link 720 begins another start time which may be regarded as the second TWT. During the TWT, the wireless device will wake up from PS mode to receive and/or transmit data. In FIG. 7A, the TWT start time offset between link 710 and link 720 is 30 TU at one start time T1. TWT parameter of link 710 is {T1, 100 TU, 25 TU} and TWT parameter of link 720 is {T1+30 TU, 50 TU, 10 TU}, and thus the TWT interval LCM of the two links is determined as 100 TU. The time T1 is picked as start time, time T2 is picked as the end time, and T2−T1=100 TU.

As shown in FIG. 7A, during the time T1 and T2, the link 710 wakes up at time [0, 25])TU, and the link 720 wakes up at time ([30, 40], [80, 90])TU. In this case, with the TWT offset between the two links, the total wake-up time length of all links between the start time T1 and the end time T2 is 45 TU in each 100 TU. Thus, according to the above equation (7), in the case where a TWT offset exists, the wake-up ratio $WR_{TWT}$ is calculated to be 0.45.

As indicated by 750 in FIG. 7B, which illustrates a case where no TWT offset exists due to the TWT synchronization. As compared with FIG. 7A, the start time of TWT on links 710 and 720 are aligned to be the same start time T1 in FIG. 7B. In FIG. 7B, TWT parameter of link 710 is {T1, 100 TU, 25TU} and TWT parameter of link 720 is {T1, 50 TU, 10 TU}, and thus the TWT interval LCM of the two links is also determined as 100 TU. During the time T1 and T2, the link 710 wakes up at time [0, 25])TU, and the link 720 wakes up at time ([0, 10], [50, 60])TU. In this case, without the TWT offset between the two links, the total wake-up time length of all links between the start time T1 and the end time T2 is 35 TU in each 100 TU. Thus, according to the above equation (7), in the case where no TWT offset exists, the wake-up ratio $WR_{TWT}$ is calculated to be 0.35, which is lower than that in FIG. 7 where a TWT offset exists.

In some embodiments, the overlapped TWT SPs may be determined, and the TWT session on the links may be adjusted accordingly. For example, if a first TWT SP on the first link is greater than a second TWT SP on the second link, the TWT session may be moved from the second link to the first link. In IEEE 802.11be, an AP MLD is mandatory support for default TID-to-link mapping, so if $TWT_{SPs(X)} \cap TWT_{SPs(Y)} \approx \emptyset$, the TID traffic can go through any links. Accordingly, the overlapped TWT SPs may be adjusted to save more power.

As indicated by 790 in FIG. 7C, which illustrates a case where no TWT offset exists and the overlapped TWT SPs are adjusted. TWT parameter of link 710 is {T1, 100 TU, 25 TU} and TWT parameter of link 720 is changed from {T1, 50 TU, 10 TU} to be {T1+50, 100 TU, 10 TU}. In this case, the total wake-up time length of all links between the start time T1 and the end time T2 is still 35 TU in each 100 TU. Thus, according to the above equation (7), in the case where no TWT offset exists and the overlapped TWT SPs are adjusted, the wake-up ratio $WR_{TWT}$ is calculated to be 0.35. Although the wake-up ratio $WR_{TWT}$ in FIG. 7C is the same as that in FIG. 7B, it reduces the time of launching on link 720 and saves more power on link 720 in FIG. 7C.

It is to be understood that although two links are shown in FIGS. 7A-7C based on MLO, the MLO may have more links for TWT between the AP MLD 110 and the STA MLD 120. For example, in a case where three links are established between the AP MLD and the STA MLD, the TWTs of the three links may be aligned at the same start time.

According embodiments of the present disclosure, aligning TBTTs and tuning beacon interval(s) and TWT parameter(s) can improve the power saving of the wireless device, and high beacon interval and TWTwake interval can save more power.

Figure 8:
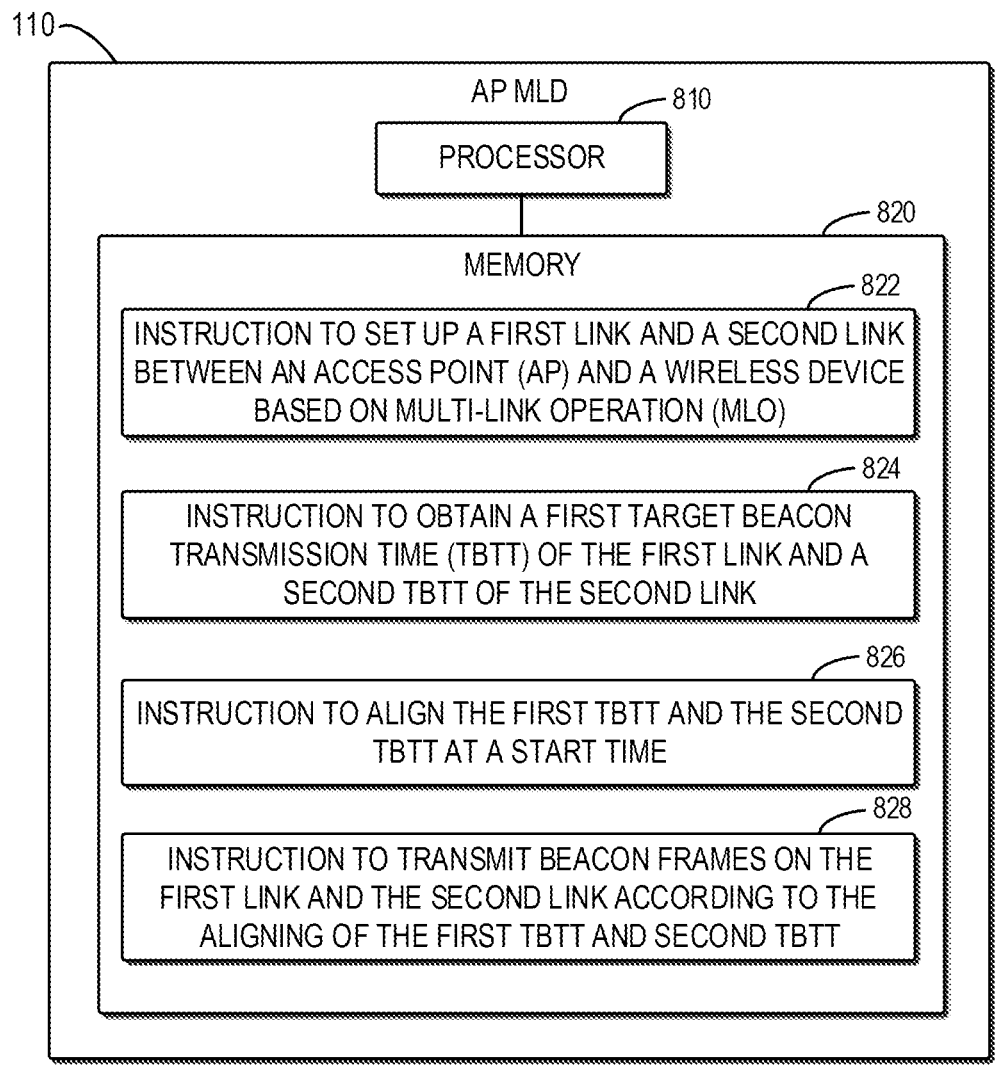
FIG. 8 illustrates an example AP MLD according to embodiments of the present disclosure.

FIG. 8 illustrates an example AP MLD 110 according to embodiments of the present disclosure. As shown in FIG. 8, the AP MLD 110 comprises at least one processor 810 and a memory 820 coupled to the at least one processor 810. The memory 820 stores instructions 822, 824, 826 and 828 to cause the processor 810 to perform actions according to embodiments of the present disclosure.

As shown in FIG. 8, the memory 820 stores instruction 822 to setup a first link and a second link between an access point (AP) and a wireless device based on multi-link operation (MLO), and instruction 824 to obtain a first target beacon transmission time (TBTT) of the first link and a second TBTT of the second link. As shown in FIG. 8, the memory 820 further stores instruction 826 to align the first TBTT and the second TBTT at a start time, and instruction 828 to transmit beacon frames on the first link and the second link according to the aligning of the first TBTT and second TBTT.

In some embodiments, the instruction 826 is further used to select a target time for aligning the first TBTT and the second TBTT, determine the target time as the start time for transmitting beacon frames on the first link, and determine the target time as the start time for transmitting beacon frames on the second link.

In some embodiments, the memory 820 further stores instructions to obtain a first beacon interval for transmitting beacon frames on the first link, and obtain a second beacon interval for transmitting beacon frames on the second link. The memory 820 further stores instructions to determine whether the first beacon interval is different from the second beacon interval, and in response to determining that the first beacon interval is different from the second beacon interval, adjust the second beacon interval of the second link to be the same as the first beacon interval of the first link.

In some embodiments, the instruction 826 is further used to obtain a third TBTT of a third link between the AP and the wireless device, and align the first TBTT, the second TBTT and third TBTT at the start time.

In some embodiments, the memory 820 further stores instructions to obtain a third beacon interval for transmitting beacon frames on the third link, determine whether the first beacon interval is different from the third beacon interval. The memory 820 further stores instructions to, in response to determining that the first beacon interval is different from the third beacon interval, adjust the third beacon interval of the third link to be the same as the first beacon interval of the first link.

In some embodiments, wherein the wireless device enters into a power save mode after completing the transmission of beacon frames on both the first link and the second link.

In some embodiments, the memory 820 further stores instructions to obtain a target wake time (TWT) of the first link and a second TWT of the second link, align the first TWT and the second TWT at a start time, and transmit TWT sessions on the first link and the second link according to the aligning of the first TWT and second TWT.

In some embodiments, the memory 820 further stores instructions to obtain a first TWT service period of the first link and a second TWT service period of the second link, determine a overlapped TWT service period based on the first TWT service period and the second TWT service period, and adjust the TWT sessions on the first link and the second link according to the overlapped TWT service period.

In some embodiments, the memory 820 further stores instructions to determine whether the first TWT service period is greater than the second TWT service period. The memory 820 further stores instructions to, in response to determining that the first TWT service period is greater than the second TWT service period, move a TWT session corresponding to the second TWT service period from the second link to the first link, and use the first link to transmit the moved TWT session.

In some embodiments, there is disclosure a non-transitory computer-readable medium. The non-transitory computer-readable medium comprise instructions stored thereon, when executed by an access point (AP), cause the AP to setup a first link and a second link between an access point (AP) and a wireless device based on multi-link operation (MLO), and obtain a first target beacon transmission time (TBTT) of the first link and a second TBTT of the second link. The instructions, when executed by the AP, further cause the AP to align the first TBTT and the second TBTT at a start time, and transmit beacon frames on the first link and the second link according to the aligning of the first TBTT and second TBTT.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate embodiments may also be implemented in combination in a single implementation. Conversely, various features that are described in the context of a single implementation may also be implemented in multiple embodiments separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A method comprising:
    setting up a first link and a second link between an access point (AP) and a wireless device based on multi-link operation (MLO);
    obtaining a first target beacon transmission time (TBTT) of the first link and a second TBTT of the second link;
    aligning the first TBTT and the second TBTT at a start time; and
    transmitting beacon frames on the first link and the second link according to the aligning of the first TBTT and second TBTT;
    obtaining a first beacon interval for transmitting beacon frames on the first link;
    obtaining a second beacon interval for transmitting beacon frames on the second link;
    determining whether the first beacon interval is different from the second beacon interval; and
    in response to determining that the first beacon interval is different from the second beacon interval, adjusting the second beacon interval of the second link to be the same as the first beacon interval of the first link.

2. The method according to claim 1, wherein aligning the first TBTT and the second TBTT at a start time comprises:
    selecting a target time for aligning the first TBTT and the second TBTT;
    determining the target time as the start time for transmitting beacon frames on the first link; and
    determining the target time as the start time for transmitting beacon frames on the second link.

3. The method according to claim 1, wherein aligning the first TBTT and the second TBTT at a start time comprises:
    obtaining a third TBTT of a third link between the AP and the wireless device; and
    aligning the first TBTT, the second TBTT and third TBTT at the start time.

4. The method according to claim 3, further comprising:
    obtaining a third beacon interval for transmitting beacon frames on the third link;
    determining whether the first beacon interval is different from the third beacon interval; and
    in response to determining that the first beacon interval is different from the third beacon interval, adjusting the third beacon interval of the third link to be the same as the first beacon interval of the first link.

5. The method according to claim 1, wherein the wireless device enters into a power save mode after completing the transmission of beacon frames on both the first link and the second link.

6. The method according to claim 1, further comprising:
    obtaining a target wake time (TWT) of the first link and a second TWT of the second link;
    aligning the first TWT and the second TWT at a start time; and
    transmitting TWT sessions on the first link and the second link according to the aligning of the first TWT and second TWT.

7. The method according to claim 6, further comprising:
    obtaining a first TWT service period of the first link and a second TWT service period of the second link;
    determining an overlapped TWT service period based on the first TWT service period and the second TWT service period; and
    adjusting the TWT sessions on the first link and the second link according to the overlapped TWT service period.

8. The method according to claim 7, wherein adjusting the TWT sessions on the first link and the second link according to the overlapped TWT service period comprises:
    determining whether the first TWT service period is greater than the second TWT service period;
    in response to determining that the first TWT service period is greater than the second TWT service period, moving a TWT session corresponding to the second TWT service period from the second link to the first link; and using the first link to transmit the moved TWT session.

9. An access point (AP) comprising:

at least one processor; and a memory coupled to the at least one processor, the memory storing instructions to cause the at least one processor to perform acts comprising:

setting up a first link and a second link between the AP and a wireless device based on multi-link operation (MLO);

obtaining a first target beacon transmission time (TBTT) of the first link and a second TBTT of the second link;

aligning the first TBTT and the second TBTT at a start time; and transmitting beacon frames on the first link and the second link according to the aligning of the first TBTT and second TBTT;

obtaining a first beacon interval for transmitting beacon frames on the first link;

obtaining a second beacon interval for transmitting beacon frames on the second link;

determining whether the first beacon interval is different from the second beacon interval; and in response to determining that the first beacon interval is different from the second beacon interval, adjusting the second beacon interval of the second link to be the same as the first beacon interval of the first link.

10. The AP according to claim 9, wherein aligning the first TBTT and the second TBTT at a start time comprises:

selecting a target time for aligning the first TBTT and the second TBTT;

determining the target time as the start time for transmitting beacon frames on the first link; and determining the target time as the start time for transmitting beacon frames on the second link.

11. The AP according to claim 9, wherein aligning the first TBTT and the second TBTT at a start time comprises:

obtaining a third TBTT of a third link between the AP and the wireless device; and aligning the first TBTT, the second TBTT and third TBTT at the star time.

12. The AP according to claim 11, the acts further comprising:

obtaining a third beacon interval for transmitting beacon frames on the third link;

determining whether the first beacon interval is different from the third beacon interval; and in response to determining that the first beacon interval is different from the third beacon interval, adjusting the third beacon interval of the third link to be the same as the first beacon interval of the first link.

13. The AP according to claim 9, wherein the wireless device enters into a power save mode after completing the transmission of beacon frames on both the first link and the second link.

14. The AP according to claim 9, the acts further comprising:

obtaining a target wake time (TWT) of the first link and a second TWT of the second link;

aligning the first TWT and the second TWT at a start time; and transmitting TWT sessions on the first link and the second link according to the aligning of the first TWT and second TWT.

15. The AP according to claim 14, the acts further comprising:

obtaining a first TWT service period of the first link and a second TWT service period of the second link;

determining an overlapped TWT service period based on the first TWT service period and the second TWT service period; and adjusting the TWT sessions on the first link and the second link according to the overlapped TWT service period.

16. The AP according to claim 15, wherein adjusting the TWT sessions on the first link and the second link according to the overlapped TWT service period comprises:

determining whether the first TWT service period is greater than the second TWT service period;

in response to determining that the first TWT service period is greater than the second TWT service period, moving a TWT session corresponding to the second TWT service period from the second link to the first link; and using the first link to transmit the moved TWT session.

17. A non-transitory computer-readable medium comprising instructions stored thereon which, when executed by an access point (AP), cause the AP to:

setup a first link and a second link between the AP and a wireless device based on multi-link operation (MLO);

obtain a first target beacon transmission time (TBTT) of the first link and a second TBTT of the second link;

align the first TBTT and the second TBTT at a start time; and transmit beacon frames on the first link and the second link according to the aligning of the first TBTT and second TBTT;

obtain a first beacon interval for transmitting beacon frames on the first link;

obtain a second beacon interval for transmitting beacon frames on the second link;

determine whether the first beacon interval is different from the second beacon interval; and in response to determining that the first beacon interval is different from the second beacon interval, adjust the second beacon interval of the second link to be the same as the first beacon interval of the first link.

18. The non-transitory computer-readable medium according to claim 17, wherein the instructions, when executed by an AP, further cause the AP to:

select a target time for aligning the first TBTT and the second TBTT;

determine the target time as the start time for transmitting beacon frames on the first link; and determine the target time as the start time for transmitting beacon frames on the second link.

* * * * *